(No Model.)
2 Sheets—Sheet 1.
J. G. FALCON.
PNEUMATIC APPARATUS FOR CLEANING STRAINERS OF SUBMERGED CRIBS.
No. 374,952. Patented Dec. 20, 1887.
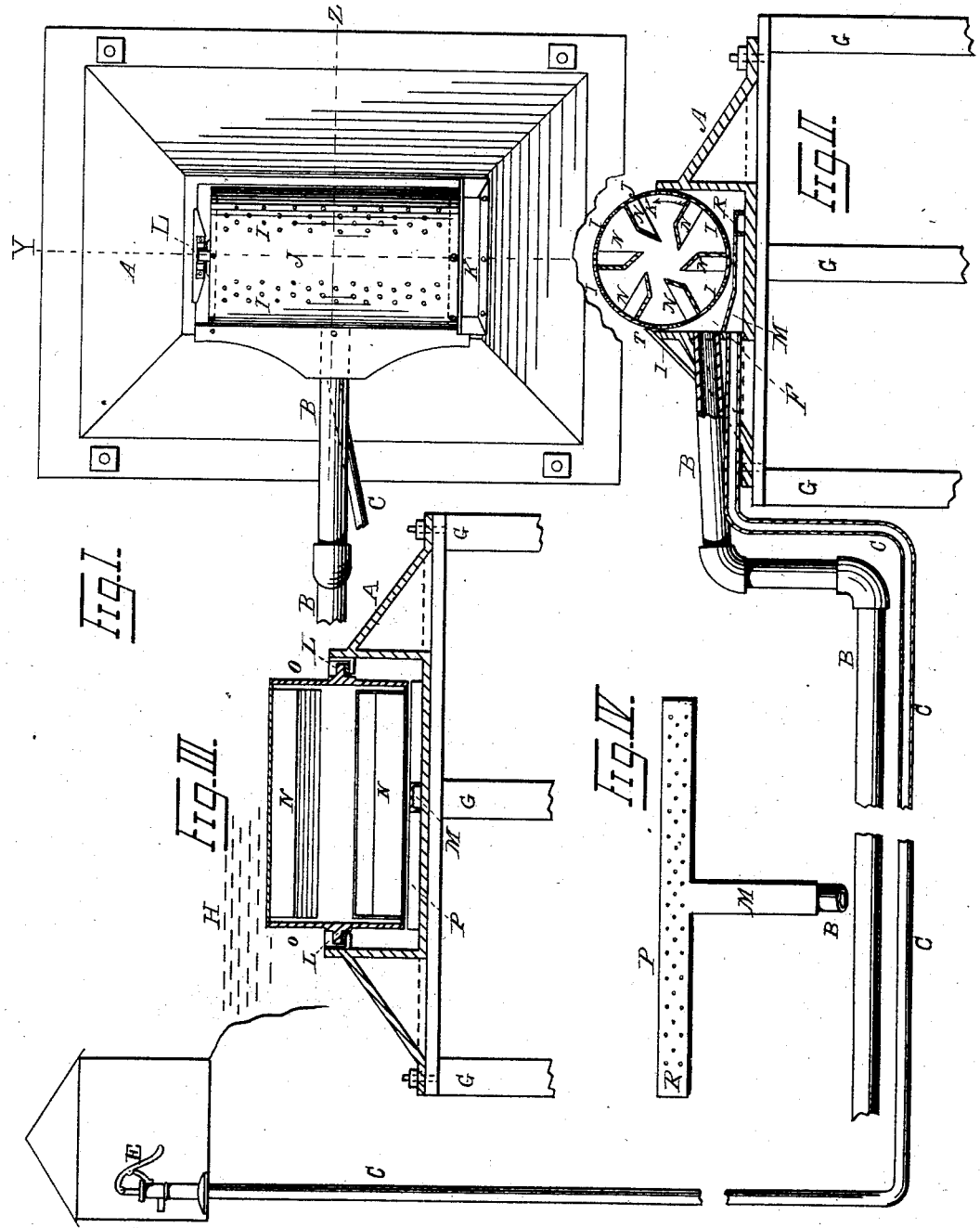
WITNESSES:
B. M. Whitaker.
C. C. Moore.
INVENTOR
Joseph G. Falcon.
BY G. L. Chapin.
ATTORNEY (No Model.) 2 Sheets—Sheet 2.
J. G. FALCON.
PNEUMATIC APPARATUS FOR CLEANING STRAINERS OF SUBMERGED CRIBS.
No. 374,952. Patented Dec. 20, 1887.
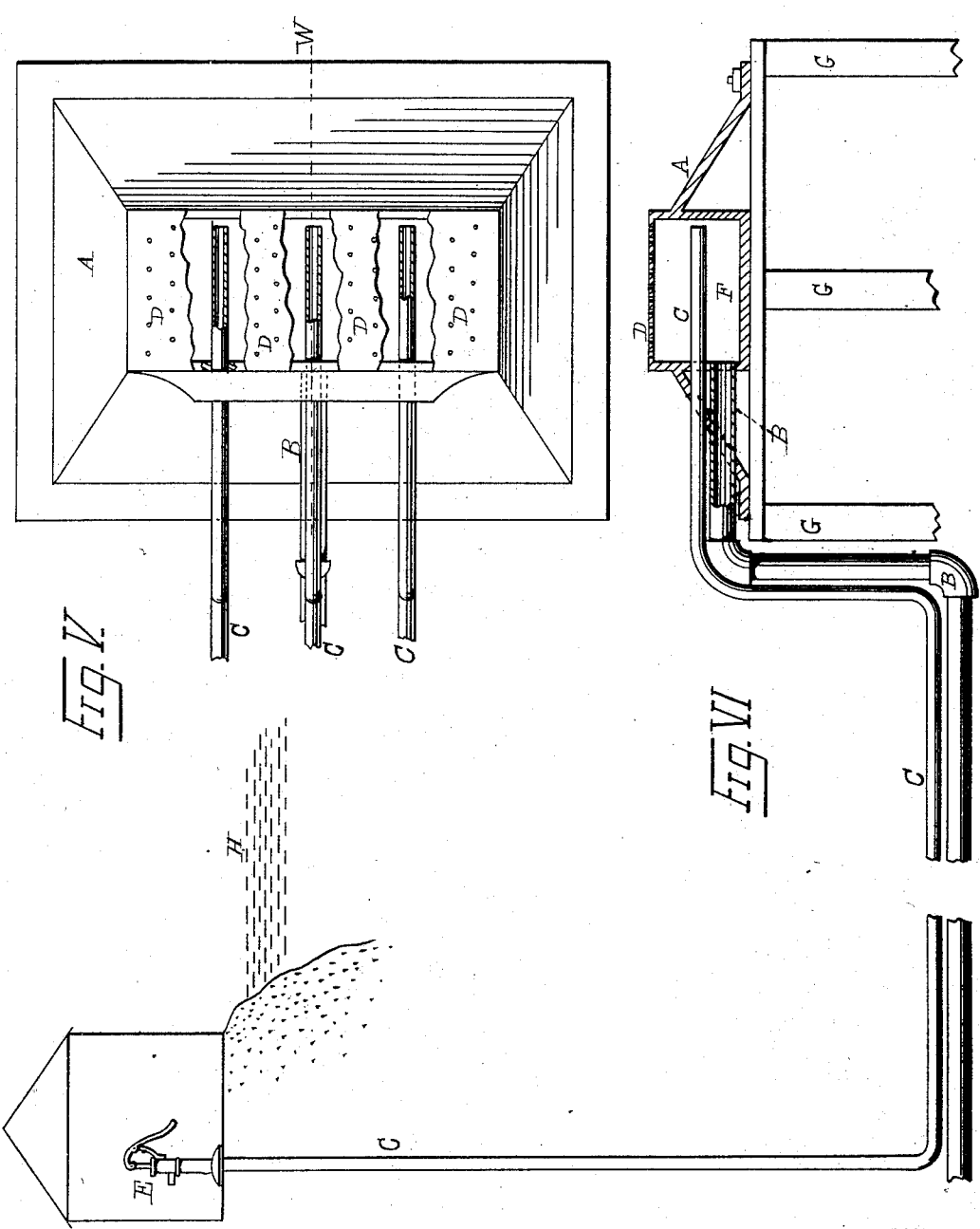
WITNESSES:
B. M. Whitaker
C. E. Moore
INVENTOR
Joseph G. Falcon,
BY G. L. Chapin
ATTORNEY

UNITED STATES PATENT OFFICE.

JOSEPH G. FALCON, OF CHICAGO, ILLINOIS.

PNEUMATIC APPARATUS FOR CLEANING STRAINERS OF SUBMERGED CRIBS.

SPECIFICATION forming part of Letters Patent No. 374,952, dated December 20, 1887.

Application filed June 20, 1887. Serial No. 241,835. (No model.)

*To all whom it may concern:*

Be it known that I, JOSEPH G. FALCON, a citizen of the United States, and a resident of Chicago, county of Cook, and State of Illinois, have invented new and useful Improvements in Pneumatic Apparatus for Cleaning Strainers of Submerged Cribs, of which the following is a specification, reference being had to the accompanying drawings, (two sheets,) illustrating the invention, in which—

Figure 1, Sheet 1, is a top or plan view of a submerged crib, in which is embodied one form of construction which I employ to put my invention into practice. Fig. 2 is a central transverse sectional elevation of the crib and strainer and a section and elevation of the air-pipe and water-supply pipe, the section of crib and strainer being on line Z, Fig. 1; Fig. 3, a longitudinal section of Fig. 1 on line Y; Fig. 4, a plan or top view of that portion of the air-pipe which lies in the reservoir of the crib, removed and enlarged. Figs. 5 and 6, Sheet 2, are views of a modification of the form of strainer employed, Fig. 5 being a broken plan view, and Fig. 6 a section of Fig. 5 on line W.

This invention relates to novel means for cleaning the strainers of submerged water-supply cribs and keeping them free from anchor-ice, fish, and other extraneous substances which are drawn to the strainer by the induction of water.

The nature of the invention, in brief, consists, first, in a pipe leading from an air force-pump into the reservoir of the crib at a point below the strainer, whereby a current of air forced into said reservoir will with such force pass out through the orifices of the strainer as to keep them free from foul substances; second, in a cylindrical strainer which is internally provided with buckets, whereby the air entering the cylinder rotates it and at the same time passes out through the orifices, removes any substance therein, and keeps extraneous substances away; third, in combination with the rotating strainer, a cutting-edge on the reservoir, which removes any substances, such as anchor-ice, sea-weeds, and fish.

Cribs of the kind referred to are generally sunk below the shipping-draft of water, and are generally supported by strong piling, and in them are formed reservoirs which are covered by strong metal strainers. A simple air-pipe connecting with an air pump and reservoir is used in connection with a strainer where only a minimum supply of water is taken through it and where the strainer has a minimum area. The rotating strainer is to be employed in all the larger supply-cribs, for the reason that its rotation is intermittent and the incoming air has only to clean a section of the orifices at a time, it being impracticable to clean an entire strainer twenty feet square at a single operation by air.

A represents the crib, which is to be made of iron and preferably with an inclined top part to prevent obstacles from lodging thereon. The reservoir is shown at F, and in the simpler form shown at Figs. 5 and 6 is covered with the ordinary strainer, D, the water-inlet pipe being shown at B at Figs. 1, 2, 5, and 6.

In Figs. 5 and 6 one or more pipes, C, are made to communicate with the reservoir F and an air force-pump, E, which is located on shore or other convenient place, whereby air with sufficient force may be put into the reservoir F and through the orifices in the strainer D to keep the latter free from obstruction. The pipe C will be of iron and lie on the bed of the body of water at the place between the crib and shore, and it should be of such weight as not to float when filled with air. When the pump E is not in operation, some little water will set back into pipe C, but not sufficient to effect the working of the apparatus. The advantage of more pipes than one at Fig. 5 is that air shall be well distributed under the strainer.

The cylindrical rotating strainer is shown at I J, J being the solid sections and I the sections in which the orifices to admit water are formed. The heads of the cylinder are shown at O O, and the bearings on the crib and the journals therein are shown at L. A series of buckets, N, are formed on the internal periphery of the cylinder, and by the action of air thereon they are moved intermittently in the direction indicated by dart K, Fig. 2. The round pipe C, Figs. 1 and 2, communicates with a pipe, M, which connects with an air-delivery pipe, P R, lying parallel with the strainer I J and in position to direct the incoming air into the buckets N. The perforations R are quite small that the air may be properly distributed under a bucket and with a force sufficient to turn the cylinder one-sixth around, and then allow its movement to intermit while another bucket is being acted on preparatory to a further movement of the cylinder. By this means, there being six buckets and six sections of orifices in the cylinder, one section of the orifices is cleaned at a time.

T represents a sharp edge on the margin of the reservoir F, which serves to scrape or cut off any substance in contact with the cylinder. Cylinder and rotating strainer I J are one and the same mechanism. No means except submarine diving are now employed to clean the strainers of submerged cribs, and when the crib cannot be reached by such means and the strainer is foul the water-supply is cut off.

I claim as new and desire to secure by Letters Patent—

The cylinder J, provided with sections of orifices I and buckets N, in combination with the reservoir F of a submerged crib, an air force-pump, E, and a pipe, C M, leading from the pump into the reservoir, and the perforated pipe P R, for directing the incoming air into the buckets N, as specified.

JOSEPH G. FALCON.

Witnesses:
G. L. CHAPIN,
ANNA D. JOHNSON.